US005615026A

United States Patent [19]

Koden

[11] Patent Number: 5,615,026

[45] Date of Patent: Mar. 25, 1997

[54] METHOD OF DRIVING ANTIFERROELECTRIC LIQUID CRYSTAL DEVICE

[75] Inventor: Mitsuhiro Koden, Nara, Japan

[73] Assignee: Sharp Kabushiki Kaisha, Osaka, Japan

[21] Appl. No.: 375,167

[22] Filed: Jan. 18, 1995

Related U.S. Application Data

[63] Continuation of Ser. No. 3,988, Jan. 15, 1993, abandoned.

[30] Foreign Application Priority Data

Jan. 17, 1992 [JP] Japan .................................... 4-006663

[51] Int. Cl.[6] ................................ G02F 1/13; G09G 3/36

[52] U.S. Cl. ............................................. 349/174; 345/97

[58] Field of Search ................................ 359/56, 100, 78, 359/59; 345/96, 97

[56] References Cited

U.S. PATENT DOCUMENTS

| | | | |
|---|---|---|---|
| 4,697,887 | 10/1987 | Okada et al. | 359/56 |
| 4,820,026 | 4/1989 | Okada et al. | 359/78 |
| 5,108,650 | 4/1992 | Koden et al. | 359/103 |
| 5,200,846 | 4/1993 | Hiroki et al. | 359/59 |
| 5,202,054 | 4/1993 | Suzuki et al. | 252/299.61 |

FOREIGN PATENT DOCUMENTS

| | | |
|---|---|---|
| 0422904 | 4/1991 | European Pat. Off. . |
| 0448032 | 9/1991 | European Pat. Off. . |
| 62-227119 | 10/1987 | Japan . |
| 63-070832 | 3/1988 | Japan . |
| 3293319 | 12/1991 | Japan . |
| 4097228 | 3/1992 | Japan . |

OTHER PUBLICATIONS

Yamawaki et al., "Electro-optical Properties of Fluorine--containing Ferroelectric Liquid Crystal cells", Japan Display, 1989, pp. 26–29.

*Primary Examiner*—William L. Sikes
*Assistant Examiner*—Charles Miller
*Attorney, Agent, or Firm*—David G. Conlin; Brian L. Michaelis

[57] ABSTRACT

A method of driving an antiferroelectric liquid crystal device, comprising a pair of substrates, each providing electrodes, insulating films and orientation films in this order thereon, which is arranged so as to be opposed to each other and interposes an antiferroelectric liquid crystal composition between the orientation films, wherein electrode on either one of the substrates comprises a plurality of scanning electrodes and a plurality of signal electrodes in a matrix form and a thin film transistor at each point of intersection of the matrix, which comprises transmitting a signal from the scanning electrode to the thin film transistor to turn on and synchronistically applying a zero or positive selective voltage waveform corresponding to a desired display to the signal electrode of odd-numbered frames and a zero or negative selective voltage waveform corresponding to the desired display to the signal electrode of even-numbered frames.

5 Claims, 8 Drawing Sheets

METHOD OF DRIVING ANTIFERROELECTRIC LIQUID CRYSTAL DEVICE

This is a continuation of application Ser. No. 08/003,988, filed on Jan. 15, 1993, now abandoned.

BACKGROUND OF THE INVENTION

1. Field of the Invention

The present invention relates to a method of driving an antiferroelectric liquid crystal device and, more specifically, to a method of driving an antiferroelectric liquid crystal device by using thin film transistors to implement such driving.

2. Description of the Related Art

Recently there has been discovered an antiferroelectric liquid crystal phase that shows switching among three stable states (A. D. L. Chandani, et al., Jpn. J. Appl. Phys., 27, L729 (1988)), triggering the discussion on new display systems using this liquid crystal phase. Among several types of antiferroelectric liquid crystals that have been reported, the antiferroelectric liquid crystal phase that corresponds to the smectic C phase may be considered the most practical, and were reported to have been made by most of the latest researches. Its notation differing among researchers, this antiferroelectric liquid crystal is represented as, for example, Sy* phase (Japanese Patent Laid-Open Publication HEI 1-213390) or $SmC_A$* (Fukuda, Literature of the 45th Joint Research by the 142nd Committee of the Japan Society for the Promotion of Science, p. 34 (1989)). It will hereinafter be represented as $SmC_A$*. Although it is reported that this $SmC_A$* phase has a spiral structure in bulk state (Fukuda, Literature of the 45th Joint Research by the 142nd Committee of the Japan Society for the Promotion of Science, p. 34 (1989)), it is also said that the phase will show such a molecular arrangement as shown in FIG. 1 (*a*) if the spiral is undone, for example by sealing the $SmC_A$* phase into a liquid crystal cell thinner than the pitch length of the spiral. In more detail, the molecular arrangement is such that dipoles are oppositely directed layer by layer to cancel each other, causing molecules to be tilted in each reversed direction layer by layer. If an electric field is applied to this state, the molecular arrangement results in one in which the dipoles are aligned with the direction of the electric field, as shown in FIG. 1 (*b*) or (*c*). The relationship between the applied voltage and the tilt angle is as shown in FIG. 2.

Liquid crystals can be in any of three stable states 1 to 3 and will draw the hysteresis curve depending on the relation between tilt angle and applied voltage, thus allowing the display function to be implemented using this relation. Accordingly, for example, display in contrast between light and shade can be done by combining polarizing plates with the display surface of a liquid crystal display device. For instance, by aligning the polarizing axes of a pair of polarizing plates put into the Cross-Nicol state with the layer normal line of the smectic layer of the antiferroelectric liquid crystal phase, such a voltage—transmittance curve can be obtained as shown in FIG. 3 (*a*).

Lately, compounds that show the $SmC_A$* phase have been reported including the following compounds (M. Johno et al., Proc. Japan Display '89. p. 22 (1989)):

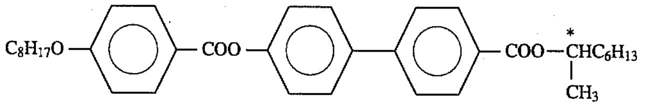

(A)

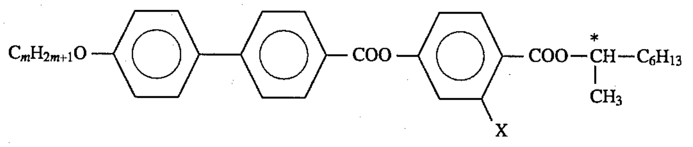

(X = H, F, Cl) (B)

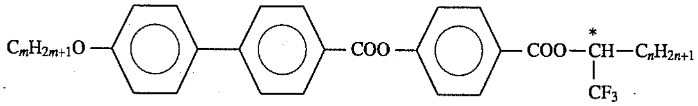

(C)

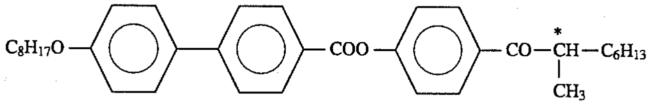

(D)

These compounds will not show the $SmC_A$* phase at room temperature; however, by providing a liquid crystal composition in which the above compounds are mixed, it is made possible to obtain a material that shows the $SmC_A$* phase in a wider temperature range around room temperature.

A matrix type liquid crystal device incorporating antiferroelectric liquid crystals has also been reported (M. Yamawaki et al., Japan Display '89, p. 26 (1989); Japanese Patent Laid-Open Publication HEI 3-125119; etc.). As one method to provide an antiferroelectric liquid crystal device, electrodes, orientation films, and the like are formed on a pair of substrates, and antiferroelectric liquid crystal material is sandwiched by the substrates, thus constituting an antiferroelectric liquid crystal device. Such an antiferroelectric liquid crystal device has advantages, such as a wide angle of visibility and high-speed response, similar to ferroelectric liquid crystal devices. Also, the antiferroelectric liquid crystal device has further advantages of being free from burning, high resistance to shocks, and the like, as compared to the ferroelectric liquid crystal device. However, when antiferroelectric liquid crystals are used to provide a matrix type liquid crystal display device, sufficient display cannot be expected unless some driving method appropriate to the properties of the antiferroelectric liquid crystals is incorporated. Some reports have been made upon the driving of antiferroelectric liquid crystals (M. Yamawaki et al., Japan Display '89, p. 26 (1989); Japanese Patent Laid-Open Publication HEI 3-125119; etc.). However, these driving methods are incapable of attaining sufficiently high contrast, incapable of providing multi-tone display, and have difficulty in such large-capacity display as to have more than 1000 scanning electrodes, disadvantageously.

The reason why the methods cannot attain sufficiently high contrast is that it would be actually quite difficult for the antiferroelectric liquid crystals to attain such an ideal voltage—transmittance curve as shown in FIG. 3 (*a*); practically, the antiferroelectric liquid crystals allow light to pass therethrough even at a low electric field strength as shown in FIG. 3 (*b*), making it difficult to attain a sufficient black display.

The reason why the methods cannot provide multi-tone display is that the simple matrix type driving in which antiferroelectric liquid crystals are applied utilizes switching among the three stable states and therefore cannot make use of the intermediate states therebetween.

The reason why the methods have difficulty in fabricating such large-capacity display devices as to have more than 1000 scanning electrodes is as follows: Implementing such driving as will be free from flickers requires the frame cycle to be not less than 60 Hz. For example, in the case of 60 Hz, one frame is allotted 16.7 msec; if the number of scanning electrodes is 1000, the write time per scanning electrode results in 16.7 μsec (=16.7 msec÷1000). Although the antiferroelectric liquid crystals is required to have a response speed higher than that, the actual response speed of the antiferroelectric liquid crystal phase is slower (M. Johno et al., Proc. Japan Display '89, p. 22 (1989)), so that it is difficult to fabricate such large-capacity display devices as to have more than 1000 scanning electrodes.

SUMMARY OF THE INVENTION

The present invention provides a method of driving an antiferroelectric liquid crystal device, comprising a pair of substrates, each providing electrodes, insulating films and orientation films in this order thereon, which is arranged so as to be opposed to each other and interposes an antiferroelectric liquid crystal composition between the orientation films, wherein a electrode on either one of the substrates comprises a plurality of scanning electrodes and a plurality of signal electrodes in a matrix form and a thin film transistor at each point of intersection of the matrix, which comprises transmitting a signal from the scanning electrode to the thin film transistor to turn on and synchronistically applying a zero or positive selective voltage waveform corresponding to a desired display to the signal electrode of odd-numbered frames and a zero or negative selective voltages waveform corresponding to the desired display to the signal electrode of even-numbered frames.

Further, it is preferable that the thin film transistor is provided by amorphous silicon or polysilicon semiconductor films. It is also preferable that the orientation films are polymeric organic films and that only the orientation films on the side of the substrates on which there are provided no thin film transistors are subjected to rubbing treatment.

DETAILED DESCRIPTION OF THE INVENTION

Figures 1A, 1B, 1C:
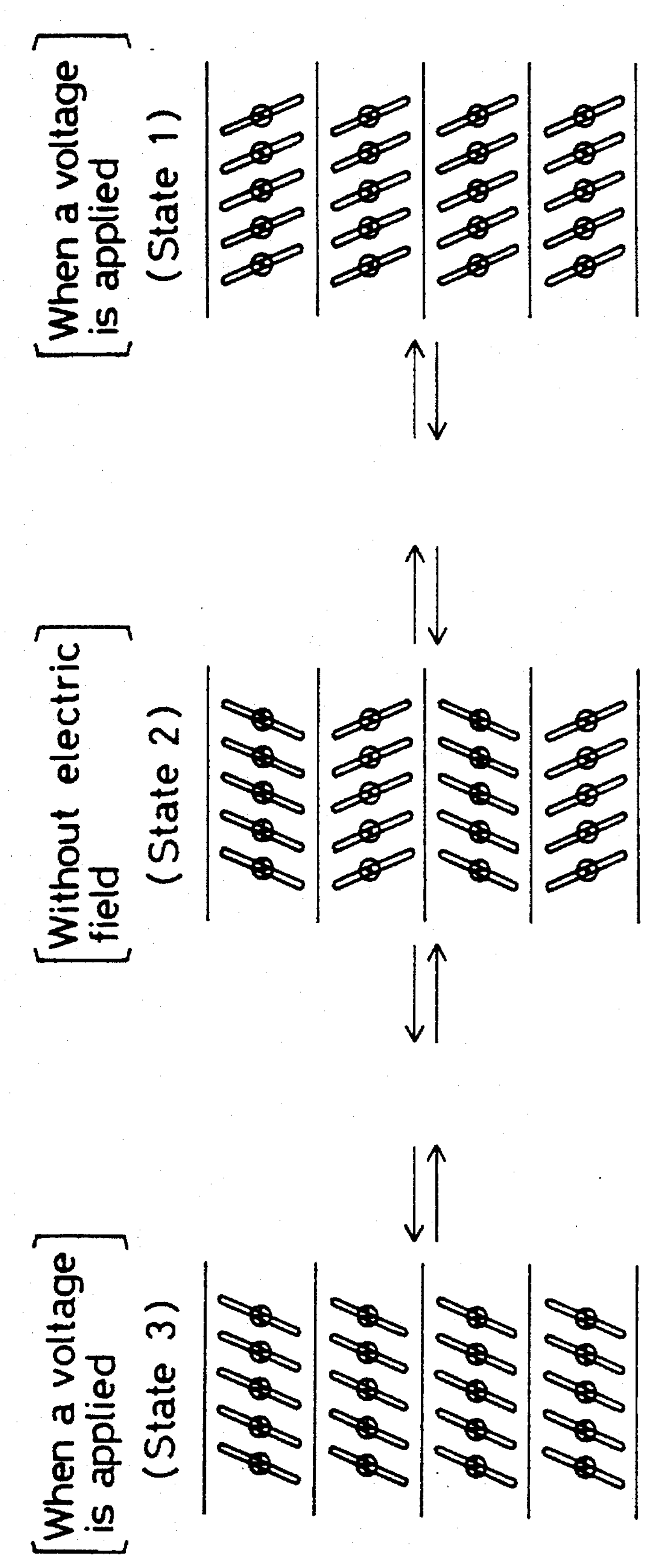
FIGS. 1(*a*)–(*c*) are schematic views for explaining the switching of an antiferroelectric liquid crystal device.

The present invention provides a method of driving a matrix type antiferroelectric liquid crystal device which utilizes an antiferroelectric liquid crystal phase and is capable of high information content display, high contrast, and multi-tone display.

Antiferroelectric liquid crystal compounds applicable to the present invention include those listed in the following table, in addition to those represented by the formulas (A), (B), (C), and (D):

| Comp'd NO | $R_1$— | —$R_2$ | Skeleton | Phase Transition Temperature (°C.) |
|---|---|---|---|---|
| 1 | $C_6H_{17}O$ | $C_6H_{13}$ | 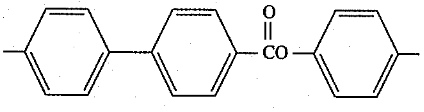 | Cr68($S_{1A}$°66)$S_{CA}$°119.8$S_{Cy}$°120.7$S_C$°122.2$S_A$149.81so |
| 2 | $C_7H_{15}$ | $C_6H_{13}$ | 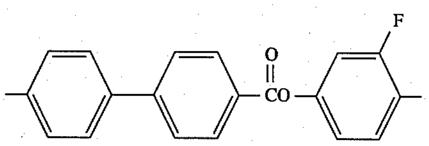 | Cr28$S_{CA}$°73.8$S_A$107.71so |
| 2 | $C_{11}H_{23}$ | $C_6H_{13}$ | | Cr17$S_{CA}$°75.8$S_{Cy}$°76.4$S_C$°81.4$S_A$94.31so |
| 3 | $C_{12}H_{25}$ | $C_6H_{13}$ | | Cr30$S_{CA}$°65.6$S_{Cy}$°71.2$S_C$°81.3$S_A$92.21so |
| 4 | $C_7H_{15}O$ | $C_6H_{13}$ | | Cr67$S_{CA}$°117.6$S_C$°121.2$S_A$144.61so |
| 5 | $C_6H_{17}O$ | $C_6H_{13}$ | | Cr37$S_{CA}$°123.7$S_C$°124.2$S_A$141.71so |
| 6 | $C_{10}H_{21}O$ | $C_6H_{13}$ | | Cr31$S_{CA}$°118.6$S_C$°122.3$S_A$ 132.61so |
| 7 | | | | |

-continued

| Comp'd NO | $R_1-$ | $-R_2$ | Skeleton | Phase Transition Temperature (°C.) |
|---|---|---|---|---|
| 8 | $C_6H_{17}O$ | $C_6H_{13}$ | 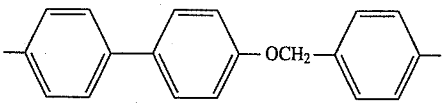 | $Cr72S_A107.2S_{CA}{}^\circ117.6S_C{}^\circ121.2S_A144.6Iso$ |
| 9 | $C_6H_{17}O$ | $C_6H_{13}$ | 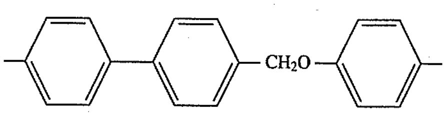 | $Cr78(S_A72.8)S_{CA}{}^\circ94.2S_C{}^\circ100.1S_A108.0Iso$ |
| 10 | $C_6H_{17}O$ | $C_6H_{13}$ | 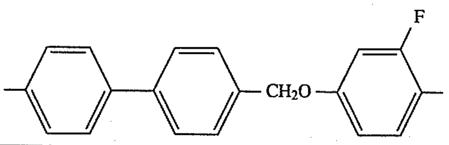 | $Cr65S_{CA}{}^\circ82.9S_C{}^\circ85.5S_A92.3Iso$ |
| 11 | $C_6H_{17}O$ | $C_4H_9$ | | $Cr58S_{CA}{}^\circ88.1S_C{}^\circ90.4S_A99.9Iso$ |
| 12 | $C_6H_{17}O$ | $C_3H_7$ | | $Cr62S_{CA}{}^\circ95.7S_A104.6Iso$ |
| 13 | $C_9H_{19}$ | $C_6H_{13}$ | | $Cr28S_{CA}{}^\circ38.7S_{C\gamma}{}^\circ38.8S_C{}^\circ44.4S_A54.9Iso$ |
| 14 | $C_9H_{19}$ | $C_4H_9$ | | $Cr37S_{CA}{}^\circ41.8S_C{}^\circ51.8S_A62.2Iso$ |
| 15 | $C_9H_{19}$ | $C_3H_7$ | | $Cr16S_{CA}{}^\circ57.3S_C{}^\circ58.7S_A67.0Iso$ |

TFMHPDOPB

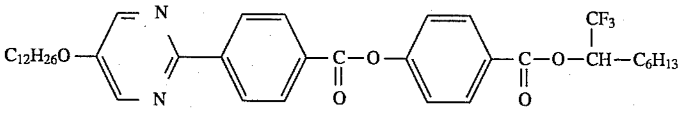

Among them, compounds (A), (B), and (C) are preferably applicable.

Further, these compounds may be used in the form of mixture as appropriate. Also, compounds other than the aforenoted antiferroelectric liquid crystal compounds may be mixed as appropriate. These compounds are not necessarily required to show the liquid crystal phase, including:

(a) compounds for adjusting the temperature range of the liquid crystal phase of the composition to be prepared;

(b) optically active compounds which show large spontaneous polarization or are induced in a ferroelectric liquid crystal phase; and (c) optically active compounds for adjusting the helical pitch of the liquid crystal phase of the composition to be prepared.

First, for explaining the configuration of the antiferroelectric liquid crystal device of the present invention, a switching device for pixel 1 is described below as a typical example.

Figure 8:
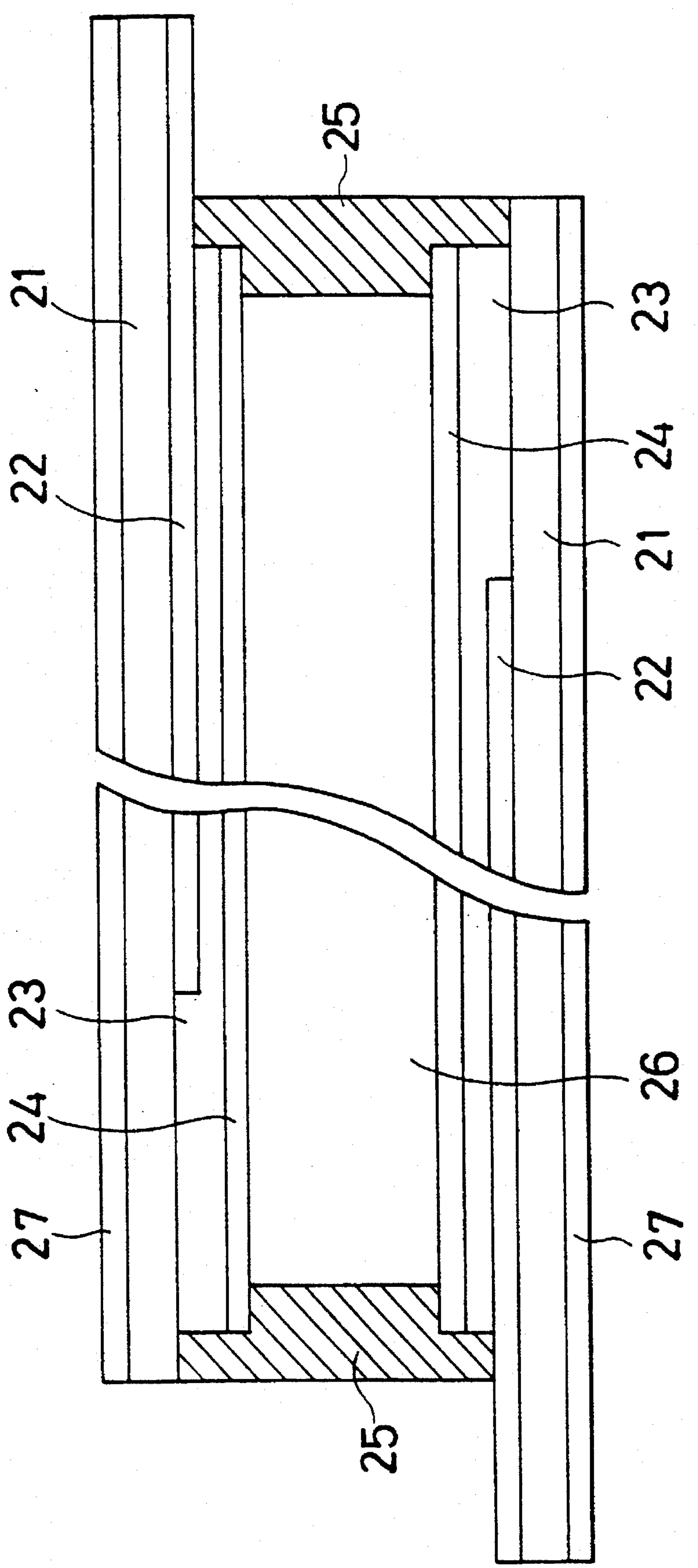
FIG. 8 is an explanatory view of the structure and fabrication method of the antiferroelectric liquid crystal device of the present invention.

FIG. 8 shows an explanatory view showing an example of the liquid crystal device utilizing the antiferroelectric liquid crystal composition of the present invention.

FIG. 8 is an example of transmission display devices, where numeral 21 denotes an insulating substrate; 22 an electrode; 23 an insulating film; 24 an orientation layer; 25 a sealing material; 26 an antiferroelectric liquid crystal composition; and 27 a polarizing plate.

The insulating substrate 21 is provided by a light-transmissible substrate, normally given by using a glass substrate. On the insulating substrate 21 are formed transparent electrodes 22 of specified patterns made of electrically conductive thin films such as of $InO_2$, $SnO_2$, and ITO (Indium-Tin Oxide).

The insulating film 23 is formed further thereon, normally, but may be omitted in some cases. The insulating film 23 may be an inorganic thin film such as of $SiO_2$, $SiN_x$, and $Al_2O_3$, or an organic thin film such as of polyimide, a photoresist resin, and polymer liquid crystals. When the insulating film 23 is an inorganic thin film, it can be formed by deposition, sputtering, CVD (Chemical Vapor Deposition), or solution coating. When the insulating film 23 is an organic thin film, on the other hand, it can be formed using a solution in which an organic substance has been dissolved, or its precursor solution by spin coating, immersion coating, screen printing, roll coating, or the like, followed by curing under specified curing conditions (heating, radiation of light beams, etc.), or otherwise can be formed by deposition, sputtering, CVD, or other like method, or by LB (Langumuir-Blodgett) method.

The orientation layer 24 is formed on the insulating film 23; however, when the insulating film 23 is omitted, the orientation layer 24 is formed directly on the electrode 22. The orientation layer may be either an inorganic layer or an organic layer.

When an inorganic orientation layer is used, a most commonly used method therefor is oblique evaporation of silicon oxide. Rotational deposition is also available. When an organic orientation layer is used, there can be used nylon, polyvinyl alcohol, polyimide, and the like, the top of which is normally subjected to rubbing treatment. Also, polymer liquid crystals or LB films can be used to implement orientation; otherwise, the orientation can be accomplished by using magnetic fields, or by the spacer edge method. Still another possible method is deposition of $SiO_2$, $SiN_x$, or the like, in addition it is possibly subjected to rubbing on the surface of the orientation layer.

Next, two substrates are laminated and an antiferroelectric liquid crystal composition 26 is injected therebetween to thereby form a liquid crystal device, to which polarizing plates 27 are installed.

Subsequently described a case where the antiferroelectric liquid crystal device of the present invention is applied to a large-capacity matrix type display device. In this case, as shown in the plane schematic view of FIG. 5, wiring for upper and lower substrates is used in combination into the form of matrix. Scanning electrodes are denoted by G1, G2, G3 to Gl in descending order, signal electrodes are by S1, S2, S3 to Sk in rightward order, and the intersection where a scanning electrode Gi and a signal electrode Sj overlap each other is denoted by a pixel Pij (where i and j are each a positive integer). The scanning electrodes of this simple matrix panel have a scanning side driver (electrodes for applying electric fields) connected thereto while the signal electrodes have a signal side driver (electrodes for applying electric fields) connected thereto.

Figure 4:
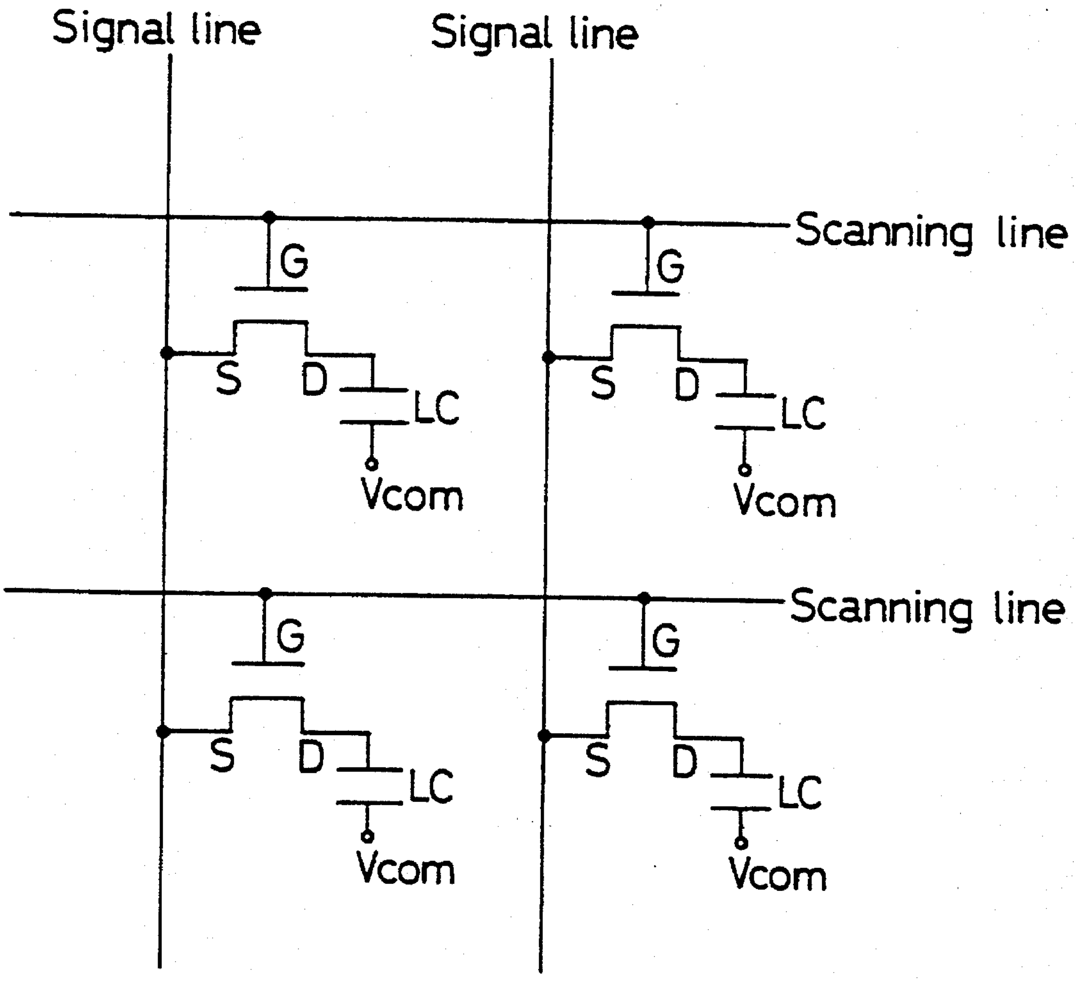
FIG. 4 is an equivalent circuit diagram for explaining active matrix type liquid crystal display.

FIG. 4 shows an equivalent circuit of the active matrix liquid crystal display device using thin film transistors (TFTs). To drive the liquid crystals, a signal is transmitted from the scanning lines to apply an electric field to gate electrodes G, thereby turning on the TFT. In synchronization with this, a signal is transmitted from the signal lines to source electrodes S, and then the signal is accumulated in liquid crystals LC via the drain electrodes D, thereby developing an electric field, which causes the liquid crystals to respond.

Figure 5:
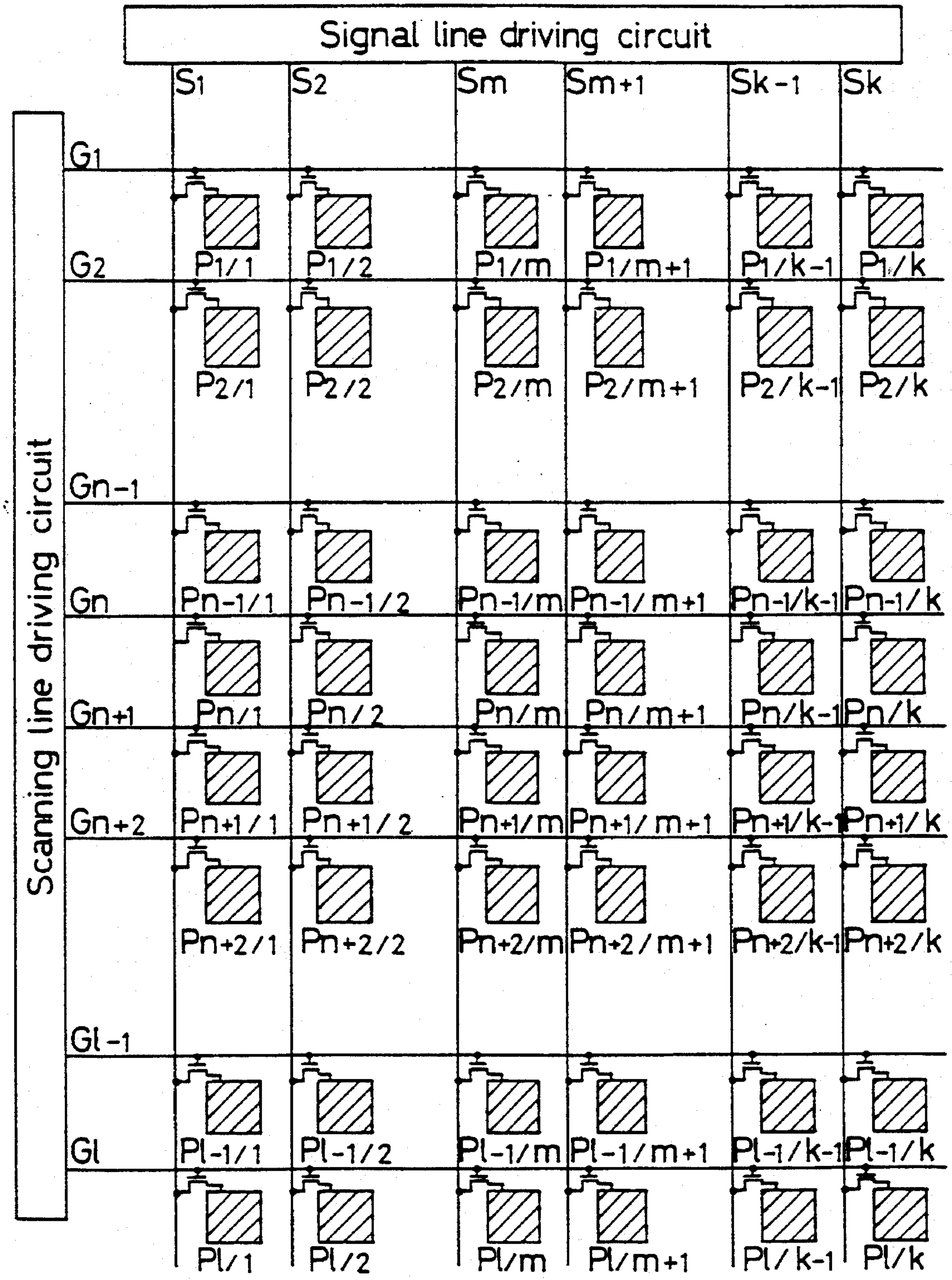
FIG. 5 is a view for explaining the active matrix type antiferroelectric liquid crystal device of the present invention.
Figure 6:
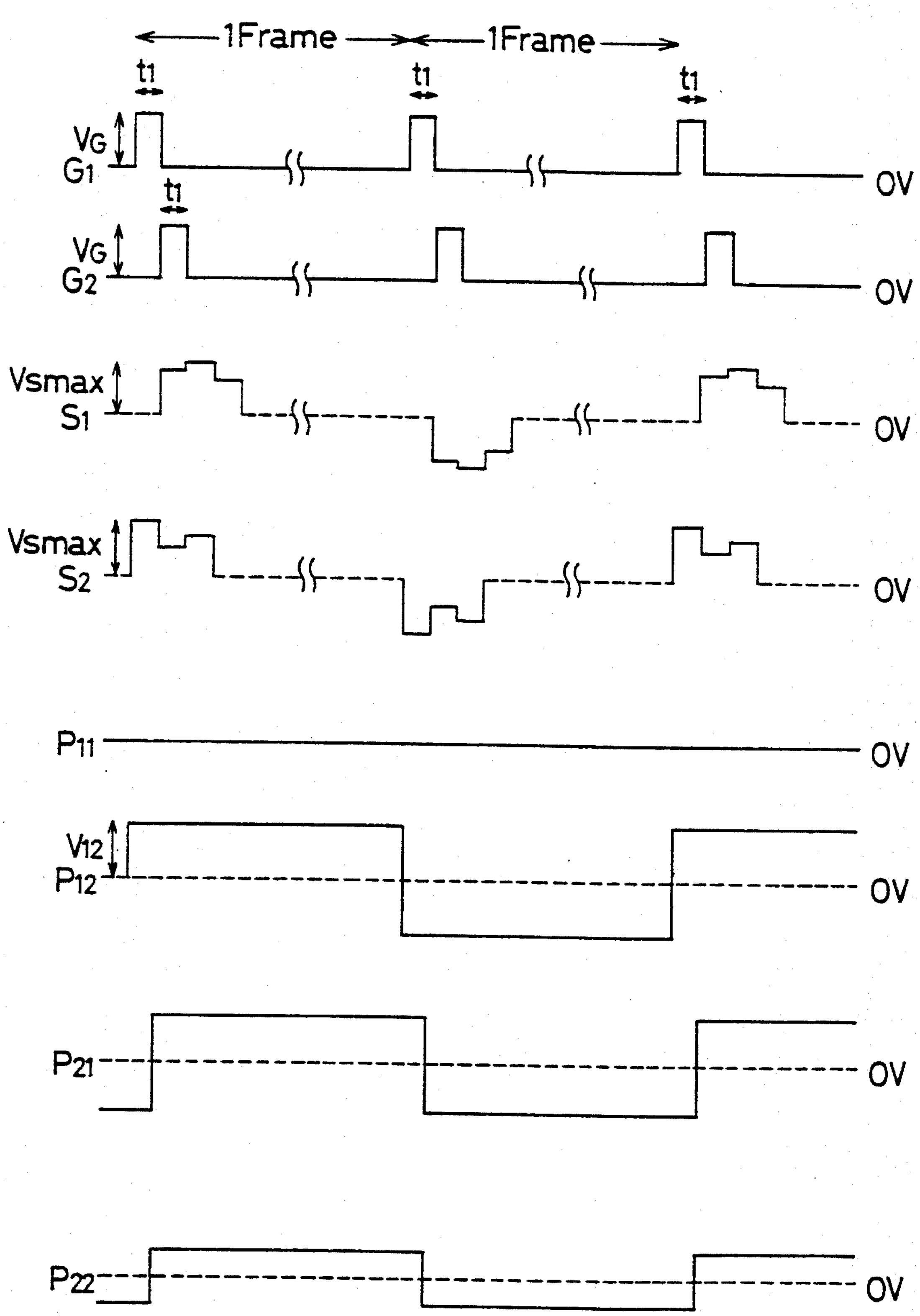
FIG. 6 is a view for explaining the driving method of the present invention.

A concrete example of the present invention is now described taking the case of such a liquid crystal device as shown in FIG. 5, the device arrangement being such that 1-in-number scanning electrodes $G_1$, $G_2$, . . . , $G_{n-1}$, $G_n$, $G_{n+1}$, $G_{n+2}$, . . . , $G_{l+1}$, $G_l$ and k-in-number signal electrodes $S_1$, $S_2$, . . . , $S_m$, $S_{m+1}$, . . . , $S_{k-1}$, $S_k$ are formed in a matrix, and thin film transistors (TFTs) are arrayed at their intersections, thus providing an active matrix substrate, which is combined with antiferroelectric liquid crystals. The gate electrode of each TFT at each intersection is connected to a scanning electrode while its source electrode is connected to a signal electrode. Designated by $P_{1/1}$, $P_{1/2}$, . . . , $P_{1/m}$, $P_{1/m+1}$, . . . , $P_{n+1}$, $P_{n+2}$, . . . , $P_{n/m}$, $P_{n/m+1}$, . . . are pixels connected to the drain electrodes of TFTs formed at the intersections. The driving waveform for driving this liquid crystal display device is shown in FIG. 6. It is assumed that polarizing plates provided in Cross-Nicol state are installed above and below the liquid crystal cell in such a manner that the polarizing axes of the polarizing plates are consistent with the layer normal line of the antiferroelectric liquid crystal phase.

Figure 2:
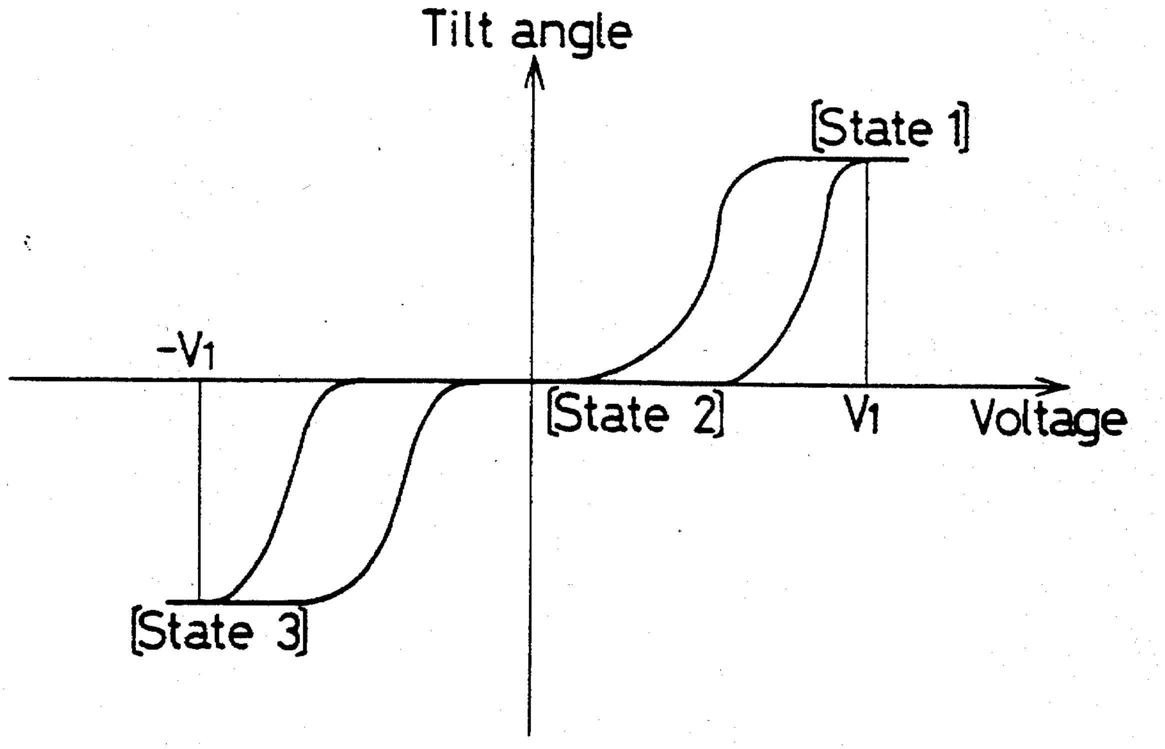
FIG. 2 is a view showing the relation between voltage and tilt angle of antiferroelectric liquid crystals.
Figure 3A:
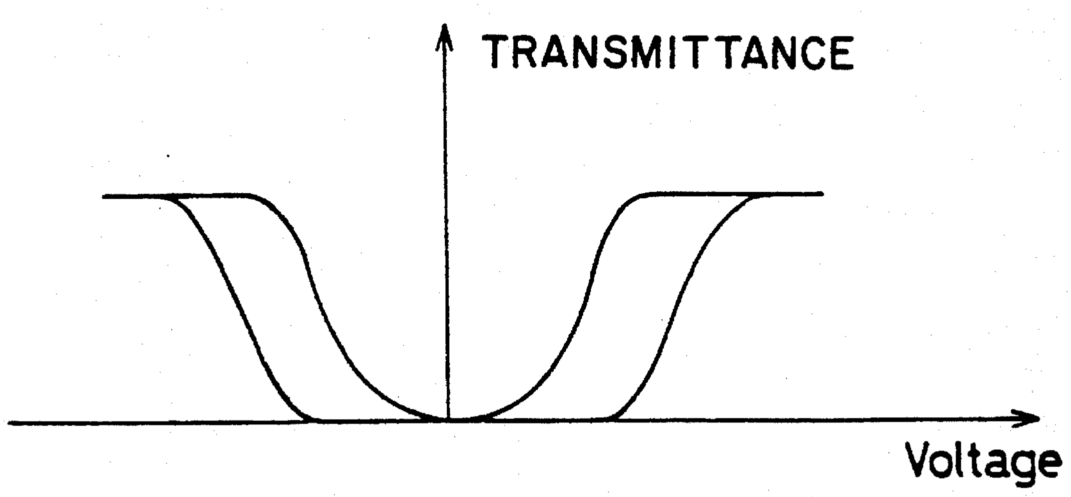
FIGS. 3(*a*)–(*b*) are views showing the relation between applied voltage and transmission in an antiferroelectric liquid crystal device.
Figure 3B:
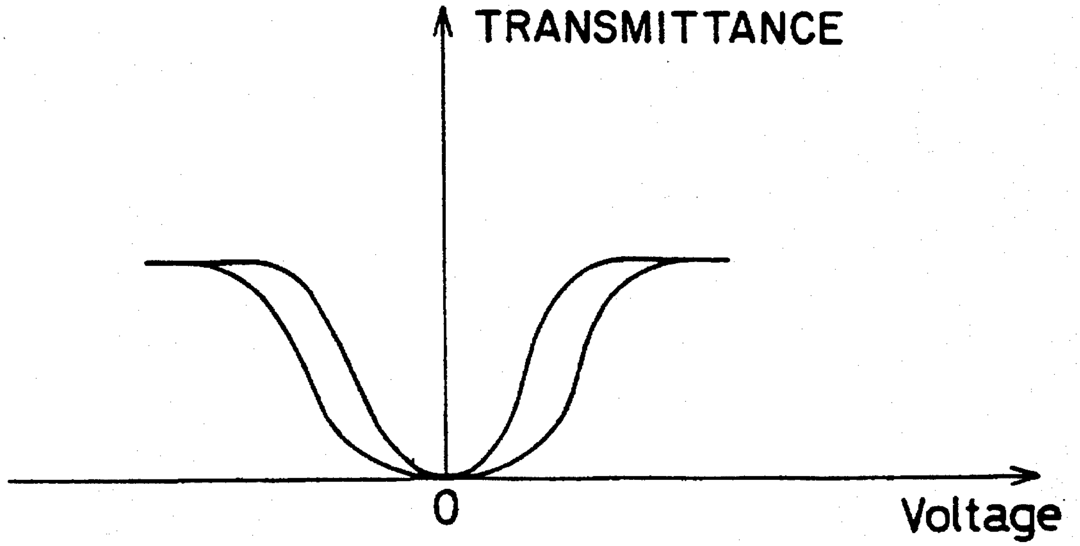

First, a TFT is turned on by transmitting a signal from scanning electrode $G_1$ fora time period of $t_1$. In synchronization with this, a zero or positive voltage that corresponds to a desired display is applied from a signal electrode to pixels connected to $G_1$ ($P_{1/1}$, $P_{1/2}$, $P_{1/m}$, $P_{1/m+1}$, $P_{1/k-1}$, $P_{1/k}$, etc.). For the next time period of $t_1$, a signal is transmitted from $G_2$, thereby turning on the TFT, and in synchronization with this, the signal is transmitted from a signal electrode. In this way, TFTs connected to the scanning electrodes are similarly turned on successively. It is noted here that the maximum value Vsmax out of voltages applied from the signal electrodes S is set to a value greater than $V_1$ in FIG. 2.

Then, after the signal has been transmitted from all the scanning electrodes, a signal is transmitted from scanning electrode $G_1$ for another time period of $t_1$, thereby turning on the TFT. In synchronization with this, a zero or positive voltage that corresponds to a desired display is applied from a signal electrode to pixels connected to $G_1$ ($P_{1/1}$, $P_{1/2}$, $P_{1/m}$, $P_{1/m+1}$, $P_{1/k-1}$, $P_{1/k}$, etc.). The signal is transmitted from $G_2$ for another time period of $t_1$, thereby turning on the TFT, and in synchronization with this, the signal is transmitted from a signal electrode. In this way, TFTs connected to the scanning electrodes are similarly turned on successively. An example of voltage waveform applied to the pixels in this process is shown in FIG. 6. Pixel $P_{11}$ will have no electric field applied thereto, resulting in a black display. Voltage $V_{12}$ applied to pixel $P_{12}$ is equal to Vsmax, greater than $V_1$ in FIG. 2, thus resulting in a white display. The voltage applied to pixels $P_{21}$ and $P_{22}$ is an intermediate value between zero and Vsmax, allowing a quantity of transmitted light corresponding to the voltage value to be obtained, and therefore a half-tone display to be obtained. In addition, a color filter, if combined, allows color display to be obtained.

As the thin film transistors provided at the intersections between scanning electrodes and signal electrodes, various-types of devices-are available,. and in-particular, TFTs using amorphous silicon (a-Si) or polysilicon (poly-Si) are preferable. As the method of fabricating the liquid crystal display device by using an active matrix substrate on which thin film transistors are provided in a matrix, electrode films are formed on another substrate; an orientation processing layer is formed on each of this substrate and the active matrix substrate; these substrates are laminated at a specified interval; and antiferroelectric liquid crystals are sandwiched between the substrates.

For forming the orientation layer, there are available rubbing method, oblique evaporation, and the like; for mass production of large-screen liquid crystal display devices, the rubbing method is preferable. In the case of rubbing method, after the orientation film has been formed, the rubbing is treated, where it may be parallel rubbing (a method in which both of a pair of substrates are subjected to rubbing treatment and laminated so that their rubbing directions will be the same), antiparallel rubbing (a method in which both of a pair of substrates are subjected to rubbing treatment and laminated so that their rubbing directions will be reverse to each other), or single substrate rubbing 1*a* method in which only one of a pair of substrate is subjected to rubbing treatment).

In the case of the antiferroelectric liquid crystal device of the present invention, although any of these orientation methods can be used, the single substrate rubbing method in which only the single substrate having no thin film transistors formed thereon is subjected to rubbing treatment is particularly preferable. The following three can be listed for its reason:

Firstly, the substrate on which thin film transistors are not formed is flatter than the other, allowing uniform rubbing treatment to be easily performed;

Secondly, if the substrate on which thin film transistors are formed was subjected to rubbing treatment, the characteristics of the thin film transistors would be changed, or dielectric breakdown would tend to occur in wiring by static electricity due to the treatment; and Thirdly, liquid crystal cells, in general, are formed by cooling its isotropic liquid state, to attain a uniform liquid crystal orientation. However, any material of the antiferroelectric liquid crystal phase generally shows the smectic A phase, not showing the nematic phase. It is known that such a material, if cooled with its isotropic liquid state, would result in misalignment between the rubbing direction and the layer normal line of the smectic phase (K. Nakagawa et al., Ferroelectrics, 85, 39 (1989)). Therefore, if both the substrates of the antiferroelectric liquid crystal device were rubbing treated, it would be contrarily difficult to form a smectic layer structure free from any torsion. A smectic layer free from distortion is easier to form when only a single substrate is subjected to rubbing treatment.

By using such an antiferroelectric-liquid crystal device of the present invention as described above, the following advantages will be offered:

Firstly, high contrast can be obtained since no electric field is applied to liquid crystals when a black state is desired;

Secondly, the quantity of transmitted light can be changed by changing the voltage applied to each pixel, thus allowing multi-tone display to be easily done;

Thirdly, the write time depends not on the response speed of liquid crystals but on the time required to turn on the thin film transistors, thus allowing such a large-capacity display as to have more than 1000 scanning electrodes to be easily done. For example, in the case of a-Si thin film transistors as the semiconductor layer, it takes no more than 16.7 μsec to turn on the thin film transistors, in which case 1000 scanning electrodes can be driven during the time period of 16.7 msec; and Fourthly, since polarity of an applied voltage is switched for every one frame, there can be provided a liquid crystal device high in reliability and free from deviation in electric charge. Also, as compared to those devices in which nematic liquid crystals are combined with TFTs, the resulting liquid crystal device is higher in response speed and wider in angle of visibility, to its advantages.

EXAMPLE

Figure 7:
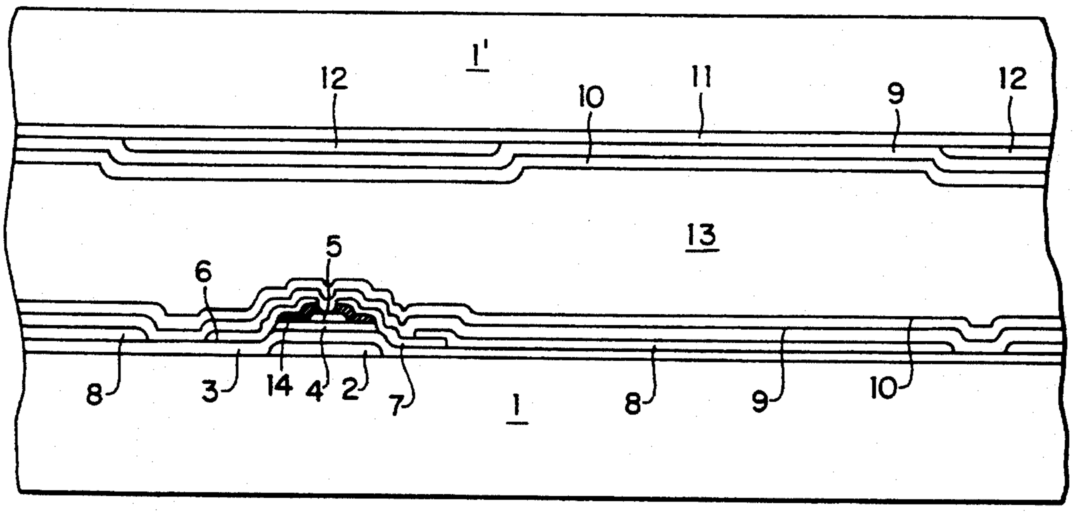
FIG. 7 is a sectional view for explaining the structure of the active matrix type antiferroelectric liquid crystal device of the present invention.

An active matrix type antiferroelectric liquid crystal device of such a structure as shown in FIG. 7 was fabricated. by the following processes. First, a Ta film was formed by sputtering on a glass substrate 1, and patterned into a specified configuration to thereby form 64 gate electrodes 2. A $SiN_x$ film 3, an a-Si semiconductor film 4, and a $SiN_x$ film 5 were continuously stacked over by plasma CVD without braking the vacuum condition, and the $SiN_x$ film 5 was patterned into a predetermined configuration. A $n^+$-a-Si film 14 in which phosphorus was doped was formed by plasma CVD, and then the $n^+$-a-Si film and the a-Si semiconductor film 4 were patterned. Subsequently a Ti film was formed by sputtering, and then the Ti film and the $n^+$-a-Si film 14 were patterned into a predetermined configuration to thereby form 64 source electrodes 6 and drain electrodes 7. An ITO film was formed by sputtering, and the film was patterned to thereby form pixel electrodes 8.

On another substrate 1', an ITO film 11 was formed by sputtering. On a pair of substrates thus prepared, a 2000 Å thick $SiO_2$ film 9 was formed, and coated with a 300 Å PVA film 10. Of the pair of substrates, only the substrate 1' was subjected to uniaxial orientation treatment by rubbing with the use of a rayon cloth. Subsequently, these two substrates were laminated via a silica spacer with a sealing material made of epoxy resin at an interval of 2 μm. Antiferroelectric liquid crystals TK C100 (manufactured by Chisso Co.) were injected through an injection port between these substrates by the vacuum injection method, and thereafter the injection port was sealed by curing with a resin of acrylic UV curing type, thus preparing a liquid crystal cell. After the injection, the cell was once heated to such a temperature that the liquid crystal composition would change into an isotropic liquid, and thereafter, cooled at a rate of 1° C./min. Further, above and below the cell were disposed polarizing plates the polarizing axes of which were crossed at approximately right angles, and the polarizing axis of one of the polarizing plates was approximately aligned with the optical axis (layer normal line) of the liquid crystals of the cell, thus providing a liquid crystal display device.

When this liquid crystal device was driven by the driving method as shown in FIG. 6 at a rate of $t_1$=15 μsec, a multi-tone display with a contrast ratio of more than 50 was obtained. Since $t_1$=15 μsec, more than 1000 scanning lines can be driven at a cycle of 60 Hz per frame (16.7 msec).

According to the present invention, it is possible to offer a method of driving an antiferroelectric liquid crystal device capable of a high information content, a wide viewing angle, high contrast, high reliability, and ability of multi-tone display.

What is claimed is:

1. A method of driving an antiferroelectric liquid crystal device, wherein the device comprises a pair of substrates, each substrate having thereon, in the following order, electrodes, an insulating film and an orientation film, the substrates being arranged so that the electrodes oppose each other with an antiferroelectric liquid crystal composition interposed between the orientation films, wherein an electrode on one of the substrates comprises a plurality of scanning electrodes and a plurality of signal electrodes that intersect the scanning electrodes to form a matrix and a thin film transistor is located at each intersection of the matrix, the method comprising:

transmitting a signal from the scanning electrode to apply to and turn on the thin film transistor; and synchronously applying to the signal electrodes of odd-numbered frames a positive selective voltage waveform corresponding to a desired display and to the signal electrode of even-numbered frames a negative selective voltage waveform corresponding to the desired display and applying a zero voltage to the signal electrodes to effect a black display.

2. A method of driving an antiferroelectric liquid crystal device as claimed in claim 1, wherein the thin film transistor comprise an amorphous silicon semiconductor film.

3. A method of driving an antiferroelectric liquid crystal device as claimed in claim 1, wherein the thin film transistor comprise a polysilicon semiconductor film.

4. A method of driving an antiferroelectric liquid crystal device as claimed in any of claims 2, 3 or 1, wherein the orientation film is a polymeric organic film, and wherein the orientation film of the substrate, opposite the one substrate on which said matrix is formed, is subjected to a rubbing treatment.

5. A method of driving an antiferroelectric liquid crystal device according to claim 1, wherein the device comprises:

a first substrate at least having a plurality of scanning electrodes, a plurality of signal electrodes, a plurality of thin film transistors and a first orientation film; the plurality of scanning electrodes intersecting with the plurality of signal electrodes to form a matrix, the plurality of thin film transistors being formed at each point of intersection of the scanning electrode and the signal electrodes, electrically connected to respective pixel electrodes, provided with a gate electrode connected to the scanning electrodes, a source electrode connected to the signal electrodes and a drain electrode connected to the pixel electrodes;

a second substrate at least having an electrode opposite to the first substrate and a second orientation film, and facing to the first substrate;

an antiferroelectric liquid crystal composition interposed between the first orientation film and the second orientation film; and a pair of polarizing plates being disposed so as to sandwich the first and the second substrates, an axis of one of the pair of polarizing plates being consistent with a layer normal line of the antiferroelectric liquid crystal composition, and another axis of the polarizing plates being crossed at a right angle with the layer normal line of the antiferroelectric liquid crystal composition.

* * * * *